(12) United States Patent
Yeh et al.

(10) Patent No.: US 6,925,508 B2
(45) Date of Patent: Aug. 2, 2005

(54) RECORDING METHOD FROM IMPROVING INTERRUPTED INTERFERENCE BY CHECKING SIZE OF MAIN BUFFER AND ALLOCATING ALTERNATIVE BUFFER TO GENERATING INTERPOLATED SAMPLE IF MAIN BUFFER IS TO SMALL

(75) Inventors: Ta-Jung Yeh, Sanchung (TW); Chia-Chin Chu, Shindian (TW)

(73) Assignee: Via Technologies, Inc. (TW)

( * ) Notice: Subject to any disclaimer, the term of this patent is extended or adjusted under 35 U.S.C. 154(b) by 200 days.

(21) Appl. No.: 10/183,542

(22) Filed: Jun. 28, 2002

(65) Prior Publication Data
US 2003/0093596 A1 May 15, 2003

(30) Foreign Application Priority Data
Nov. 9, 2001 (TW) ........................................ 90127961 A

(51) Int. Cl.[7] ............................. G06F 13/00; G06F 3/00

(52) U.S. Cl. ............................. 710/52; 710/53; 710/56; 710/57

(58) Field of Search ............................. 710/52, 53, 56, 710/57; 341/50, 51

(56) References Cited

U.S. PATENT DOCUMENTS

2002/0167608 A1 * 11/2002 Szybiak et al. ............. 348/484

FOREIGN PATENT DOCUMENTS

| TW | 299449 | 3/1997 |
| TW | 456123 | 9/2001 |

* cited by examiner

Primary Examiner—Tammara Peyton

(57) ABSTRACT

A recording method for improving interrupted interferences, for use in a recording apparatus. First, a buffer is allocated, and then, the size of the buffer is checked. If the size of the buffer is smaller than a minimum recording segment, an alternative buffer is allocated; otherwise, data is recorded to the buffer. Then the data is recorded to the alternative buffer, the data in the alternative buffer is interpolated to the buffer.

6 Claims, 5 Drawing Sheets

RECORDING METHOD FROM IMPROVING INTERRUPTED INTERFERENCE BY CHECKING SIZE OF MAIN BUFFER AND ALLOCATING ALTERNATIVE BUFFER TO GENERATING INTERPOLATED SAMPLE IF MAIN BUFFER IS TO SMALL

This application incorporates by reference Taiwanese application Serial No. 090127961, Filed Nov. 9, 2001.

BACKGROUND OF THE INVENTION

1. Field of the Invention

This patent relates in general to a recording method. More specifically, this patent relates to a recording method for improving interrupted interferences.

2. Description of Related Art

Digitalized data is easily to be stored and modified. Therefore, information, which is originally stored in an analog form, such as voice, image etc, is gradually stored in the digital form. Digitalized voice is digital audio data and comprises many samples. The quality of the digitalized voice is dependent on the sampling rate (sample number per second) and the resolution of each sample. Taking the quality of an audio CD as an example, the sampling rate is 44 k (k=1000) samples per second and the sample resolution is 16 bits. The higher the sampling rate or sample resolution is, the better the voice quality becomes. However, the required memory space for storing the audio data also increases.

FIG. 1 is a block diagram of a conventional recording apparatus 100. The recording apparatus 100 can be used in a computer system. The recording apparatus 100 comprises an audio processing unit 104 and a controlling unit 106. The computer system comprises a memory 102. The operating system of the computer allocates the memory based on a unit of sample to the recording apparatus 100 according to the amount required for recording, and the allocated memory refers to buffers. For example, if the operating system requires 1024 samples, the size of the allocated buffers is the space required for storing these samples.

The recording apparatus 100 receives an analog audio data (denoted as A in FIG. 1) according to a command issued by the operating system of the computer system, and then converts the analog audio data A to a digital audio data (denoted as D in FIG. 1) that will be stored in the buffers allocated by the operating system. The audio processing unit 104 has pointers, each pointer indicates a buffer address that can be used. After the audio processing unit 104 performs an analog-to-digital conversion, the audio processing unit 104 outputs the digital audio data D to a buffer directed by the pointer.

The conventional recording apparatus uses a dual-buffering method, i.e., two buffers are used for temporal storage in the recording process. The recording is a real-time process, and no interrupt is allowed in the recording process. Therefore, after the first buffer is full, there must be another buffer needed for the recording process, which means that two buffers are required at the same time. FIG. 2 shows schematically the conventional dual-buffering recording method. The operating system allocates buffers B(0), B(1), B(2) and B(3) for recording. The pointer 20 includes two pointer addresses 20a, 20b, pointing to the buffers B(0) and B(1) respectively. During recording data to the buffer B(0), the driver program prepares the buffer B(1) as the next recording block. During recording data to the buffer B(1), the driver program releases the buffer B(0) to the operating system for further process. Next, according to the address pointed by the pointer 20a, the buffer B(2) is prepared. The above process is repeatedly performed until the recording process is finished.

FIG. 3 is a flow chart of a conventional dual-buffering recording method. At the beginning of the recording process, at step 300, the pointer addresses 20a, 20b in the pointer 20 are respectively pointed to the buffer B(0) and B(1). Then, at step 310 the data begins to be recorded to the buffer B(0), and at the same time, the driver prepares the buffer B(1) at step 312. Next, when the buffer B(0) is completely recorded, data begin to be recorded to the buffer B(1) at step 320, and at the same time, the buffer B(0) is released to the operating system at step 322. Next, the driver prepares the buffer B(2) at step 324. When the buffer B(1) is completely recorded, data begins to be recorded to the buffer B(2) at step 330. At the same time, the driver releases the buffer B(1) to the operating system at step 332. Then, the buffer B(3) is further prepared at step 334. When the buffer B(2) is completely recorded, data begins to be recorded to the buffer B(3) at step 340. At the same time, the driver releases the buffer B(2) to the operating system at step 342. When the buffer B(3) is completely recorded, the buffer B(3) is then released to the operating system at step 350, finishing the recording process.

Steps 312, 324 and 334 are used for preparing the next buffer. However, if the buffer allocated by the buffer is too small, a size of 2 samples for example, errors occur in the recording process. Take steps 310 and 312 as an example. If the buffer B(0) prepared by the operating system is too small, the buffer will be soon full (step 310) and the data will begin to be recorded to the next buffer indicated by the pointer 20b. At this time, the buffer B(1) that might be prepared at step 312 is not prepared. Namely, the address of the buffer B(1) is not written to the pointer 20b, and therefore, data will be recorded to wrong positions, so that the released buffer B(1) at step 332 does not contain any information.

FIG. 4 shows a recorded waveform according to the conventional dual-buffering recording method. The input analog audio information is a sinusoidal waveform. Shown in the figure, there is a silent period at the midpoint of the recorded waveform, due to the cause that the driver does not have enough time to prepare the buffer. As a result, discontinuous staccatos is heard.

The size of the buffer for each recording is determined by the operating system. In general, the operating system allocates a buffer having a size of 1024 samples each time. However, if the buffer size given by the operating system is too small, 2 samples for example, the next buffer address cannot be written to the pointer table in time, and data of whole buffer will be lost.

SUMMARY OF THE INVENTION

According to the foregoing description, an object of this invention is to provide a recording method for improving interrupted interferences, to avoid the audio data from being lost in the recording process.

According to the object mentioned above, the invention provides a recording method for improving interrupted interferences, for use in a recording apparatus. First, a buffer is allocated, and then, the size of the buffer is checked. If the size of the buffer is smaller than a minimum recording segment, an alternative buffer is allocated; otherwise, data is recorded to the buffer and the process is finished. Next, data is recorded to the alternative buffer. The data in the alternative buffer are interpolated to the buffer.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

DESCRIPTION OF THE PREFERRED EMBODIMENT

The main feature of the invention is that when the buffer allocated by the operating system is too small, a size of 2 samples for example, another time interval is recorded, so that the driver has enough time to write the next buffer address to the pointer table. The invention defines a minimum recording segment m according to the time that the operating system and the driver require to prepare the buffer. In the embodiment, the minimum recording segment m is a size of 8 samples.

Figure 1:
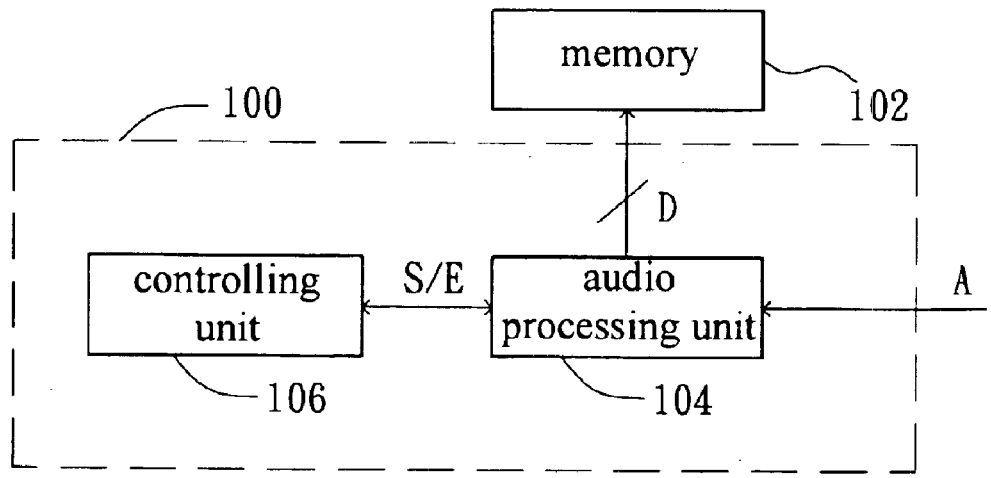
FIG. 1 is a block diagram of a conventional recording apparatus 100.
Figure 2:
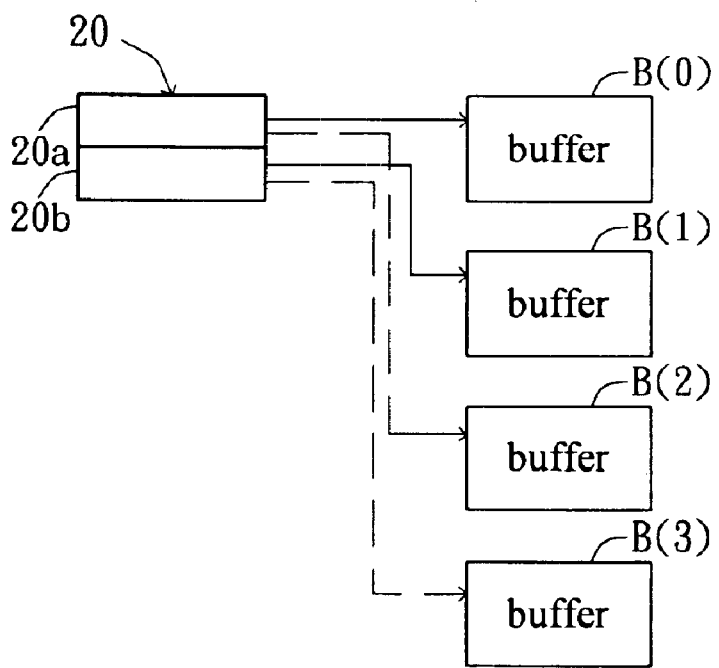
FIG. 2 shows schematically the conventional dual-buffering recording method.
Figure 3:
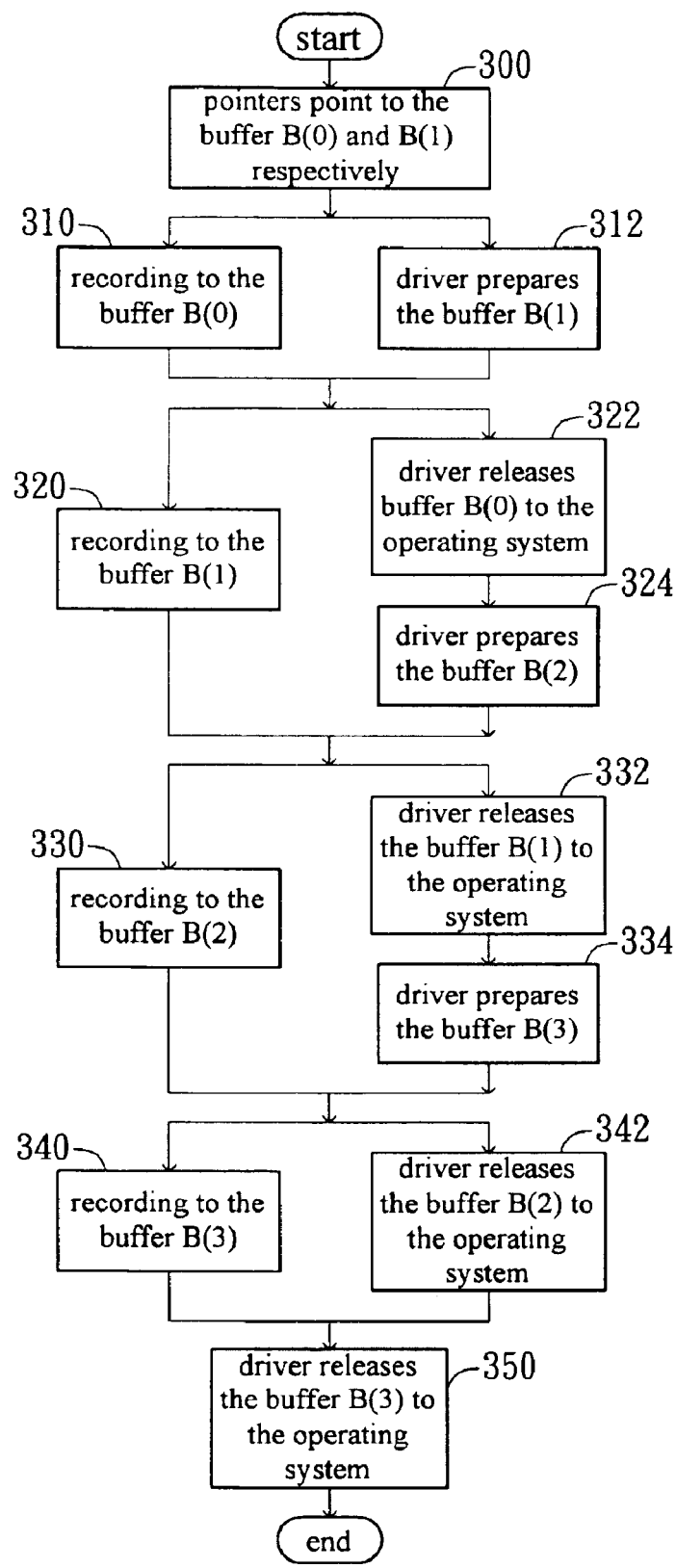
FIG. 3 is a flow chart of a conventional dual-buffering recording method.
Figure 4:
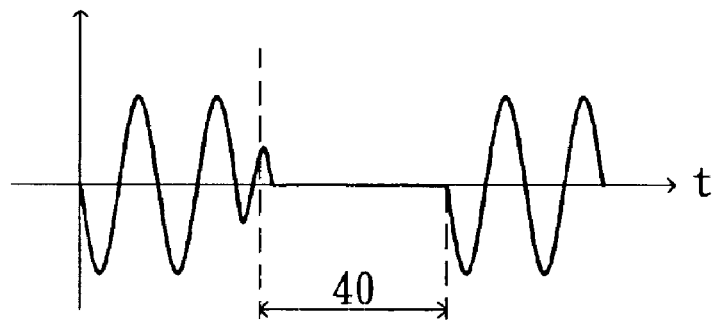
FIG. 4 shows a recorded waveform according to the conventional dual-buffering recording method.
Figure 5:
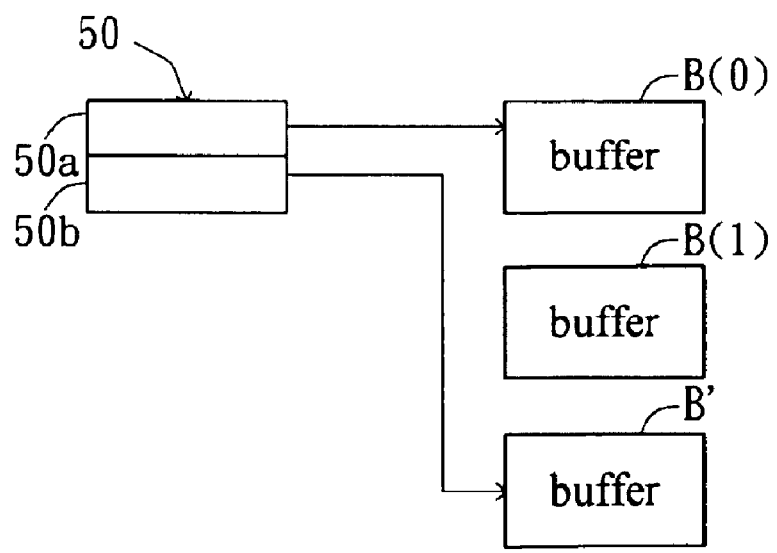
FIG. 5 schematically shows a recording method for improving the interrupted interference according to one preferred embodiment of the invention.

FIG. 5 schematically shows a recording method for improving the interrupted interference according to one preferred embodiment of the invention. First, the address of the buffer B(0) is written to a pointer address 50a of a pointer 50, and the next buffer B(1) is prepared. If the size of the buffer B(1) allocated by the operating system is smaller the size of the minimum recording segment m, it means that time to fill the buffer B(1) is too short, so that the driver has not enough time to write the address of the further next buffer newly allocated by the operating system into the pointer address. Therefore, in this situation, the operating system is forced to record a data size of the minimum recording segment m, i.e., an alternative buffer B' having an equal size of the minimum recording segment m is further allocated, and the address of the alternative buffer B' is written to the pointer address 50b for replacing the buffer B(1). Therefore, when the buffer B(0) is full, the next buffer for recording is the alternative buffer B'. After the data is recorded to the alternative buffer B(0) completely, the data in the alternative buffer B' is interpolated and then written to the buffer B(1). Because the size of the alternative buffer is larger than that of the buffer B(1), some data will be lost after being interpolated. The size of a general alternative buffer B' is a size of 8 samples. The small buffer B(1) may only have a size of 2 samples. Therefore, when the 8 samples in the alternative buffer B' are interpolated to 2 samples, data will be lost, but the human ears cannot distinguish. In comparison with the conventional method that human ears can tell the interrupted staccatos, the method of the invention can improve the interrupted interferences.

Figure 6:
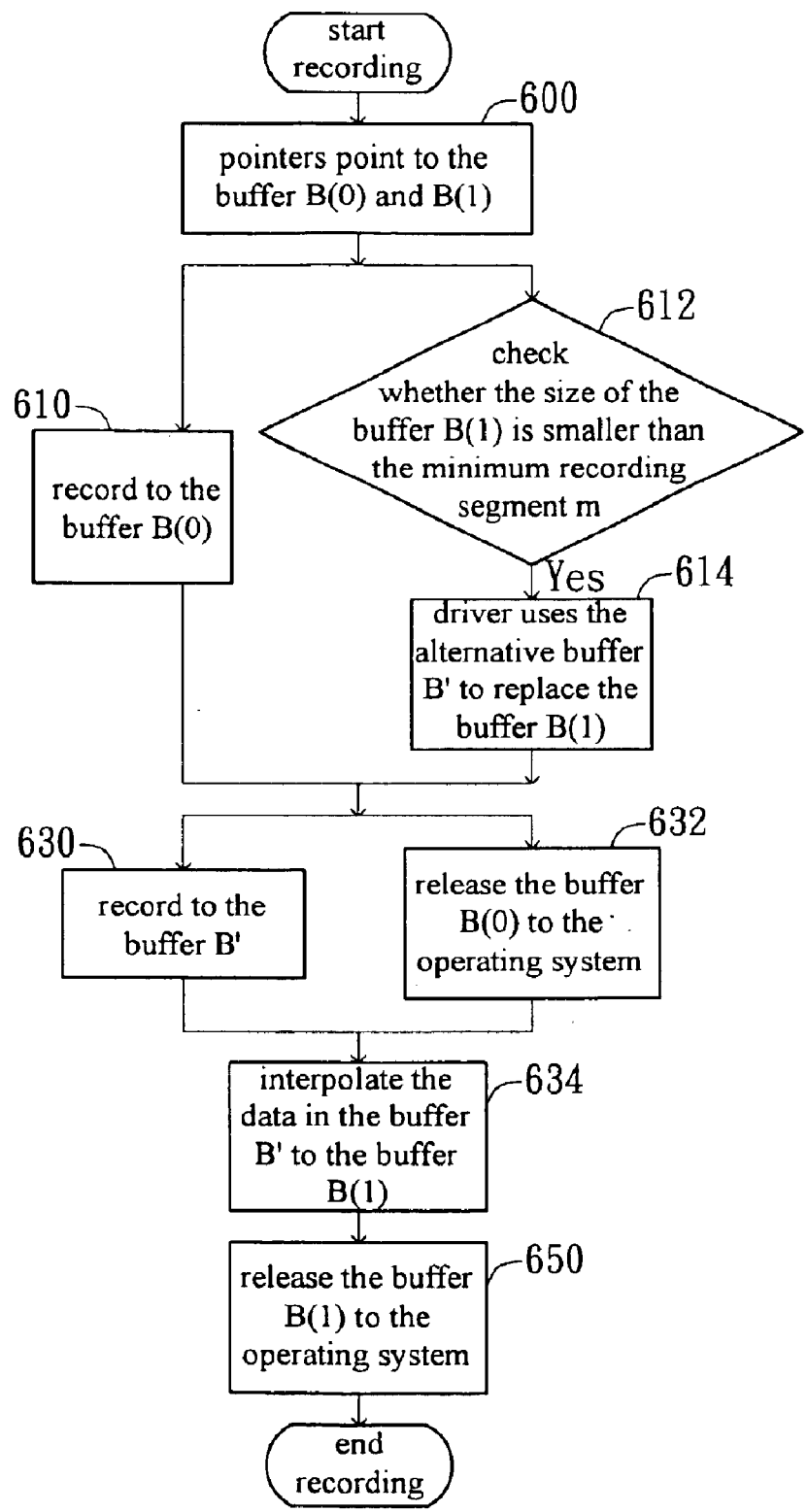
FIG. 6 is a flow chart showing the recording method for improving the interrupted interference according to one preferred embodiment of the invention.

FIG. 6 is a flow chart showing the recording method for improving the interrupted interference according to one preferred embodiment of the invention. First, at step 600, the addresses of the buffer B(1) and the buffer B(1) allocated by the operating system are written to the pointer address 50a and the pointer address 50b respectively. At step 610, the audio data begins to be recorded to the buffer B(0). At the same time, the driver checks whether the size of the buffer B(1) is smaller than the minimum recording segment m at step 612. If the answer is yes, step 614 is executed; otherwise the conventional recording method is used. At step 614, the driver uses the alternative buffer B' to replace the buffer B(1). When the data is completely recorded to the buffer B(0), the data will be next recorded to the alternative buffer B' at step 630. At the same time, the driver releases the buffer B(0) to the operating system. When the alternative buffer B' is fully recorded, the driver interpolates the data in the alternative buffer B' to the buffer B(1) at step 634, and releases the buffer B(1) to the operating system at step 650. By repeating the above process, the interrupted interferences can be improved. The method used in step 634 can be an interpolation, or a portion of samples in the alternative buffer B' are acquired according to the size of the buffer B(1).

Figure 7:
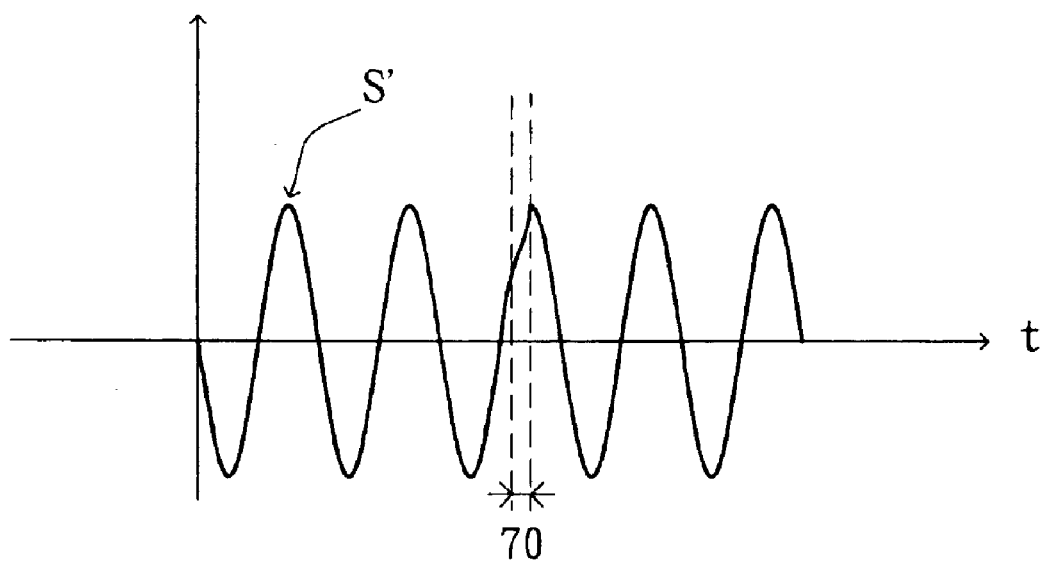
FIG. 7 is a schematic recorded waveform according to one preferred embodiment of the invention.

In general, the size of the buffer allocated by the operating system is 1024 samples, but sometimes a buffer having a size of only 2 samples is allocated in the recording process and then a buffer having a size of 1024 samples is next allocated. In this way, the address of the buffer next to the buffer having the size of 2 samples cannot be written into the pointer table in time, thereby the data is lost. The recording method for improving the interrupted interference according to the invention can solve the problem. In the embodiment, although 6 samples are lost, but 1024 samples can be avoided from being lost because the buffer allocated by the operating system is too small. The time occupied by the 6 samples is very short and therefore, the human ears cannot distinguish, so that the recording quality is significantly improved. FIG. 7 is a schematic recorded waveform according to one preferred embodiment of the invention. The time interval 70 is a waveform after being interpolated. Because the time interval is very short, the human ears cannot distinguish.

The recording method of the invention can avoid the recorded data from being lost under the condition that the human ears cannot be aware of, so that the recording quality can be improved.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What claimed is:

1. A recording method for-recording audio data, comprising:

allocating a main buffer;
   sampling the audio data to generate a plurality of samples;
   checking a size of said main buffer, and if the size of the main buffer not smaller than a minimum recording segment, storing the samples to the main buffer and terminating the method, otherwise performing the following steps:
      allocating an alternative buffer;
      storing the samples to the alternative buffer;
      generating at least one interpolated sample according to the samples stored in said alternative buffer; and storing the at least one interpolated sample to the main buffer.

2. The method of claim 1, wherein said minimum recording segment has a size of 8 samples.

3. The method of claim 1, wherein-said generating step includes generating a plurality of the interpolated samples by choosing a part of the samples in said alternative buffer according to the size of the main buffer.

4. The method of claim 1, wherein said step of generating includes generating a plurality of the interpolated samples by interpolating the samples.

5. The method of claim 1, wherein a size of said alternative buffer is larger than or equal to the minimum recording segment.

6. A recording medium for improving interruption interference, comprising:
    (a) allocating a buffer;
    (b) checking a size of said buffer allocated in step (a);
    (c) if said buffer allocated in step (a) has a buffer size that is at least as large as a minimum recording segment, recording data into said buffer allocated in step (a);
    (d) if said buffer allocated in step (a) has a buffer size that is smaller than said minimum recording segment, allocating an alternative buffer, recording said data to the alternative buffer, and interpolating said data in said alternative buffer to the buffer allocated in step (a).

* * * * *